(12) United States Patent
Lefevre et al.

(10) Patent No.: US 8,614,705 B2
(45) Date of Patent: Dec. 24, 2013

(54) METHOD AND DEVICE FOR CREATING AT LEAST TWO KEY FRAMES CORRESPONDING TO A THREE-DIMENSIONAL OBJECT

(75) Inventors: Valentin Lefevre, Puteaux (FR); Nicolas Livet, Paris (FR); Worou Pierrick Chabi, Paris (FR); Yves Quemener, Suresnes (FR)

(73) Assignee: Total Immersion, Suresnes (FR)

( * ) Notice: Subject to any disclaimer, the term of this patent is extended or adjusted under 35 U.S.C. 154(b) by 413 days.

(21) Appl. No.: 12/524,015

(22) PCT Filed: Jan. 18, 2008

(86) PCT No.: PCT/FR2008/000069
§ 371 (c)(1),
(2), (4) Date: Jul. 22, 2009

(87) PCT Pub. No.: WO2008/107554
PCT Pub. Date: Sep. 12, 2008

(65) Prior Publication Data
US 2010/0045665 A1 Feb. 25, 2010

(30) Foreign Application Priority Data

Jan. 22, 2007 (FR) .................................. 07 52810

(51) Int. Cl.
*G06T 15/00* (2011.01)
*G06T 17/00* (2006.01)

(52) U.S. Cl.
USPC .......................................... 345/419; 345/420

(58) Field of Classification Search
None
See application file for complete search history.

(56) References Cited

U.S. PATENT DOCUMENTS

| 2002/0136465 A1* | 9/2002 | Nagashima | 382/276 |
| 2004/0257368 A1* | 12/2004 | Anderson | 345/473 |
| 2005/0190972 A1* | 9/2005 | Thomas et al. | 382/218 |

FOREIGN PATENT DOCUMENTS

DE  10 2004 061 841 A1  7/2005
EP  1 594 322 A2  11/2005

OTHER PUBLICATIONS

L. Vacchetti, et al., "Fusing online and offline information for stable 3D tracking in real time", IEEE Computer Society, Jun. 18, 2003, p. 241-248, vol. 2 of 2, IEEE.

(Continued)

*Primary Examiner* — Kee M Tung
*Assistant Examiner* — Leon T Cain, II
(74) *Attorney, Agent, or Firm* — Blue Capital Law Firm, P.C.

(57) ABSTRACT

The invention relates to a method and a device for creating at least two key images each including an image representing at least one three-dimensional object in a three-dimensional environment, and the exposure of the object in said environment from the viewpoint of the associated image, said method being characterized in that it comprises the following steps: acquiring a first image representing the object in a a predetermined initial position; creating a first key image from the first acquired image and the relative exposure of the least one second image representing said object, the viewpoint of at least one said second image being different from the viewpoint of said first image; determining the relative exposure of the object in its environment based on the difference between the viewpoints of the first image and at least one said second image, each of said viewpoints being determined relative to a position and an orientation; and creating a second key image based on said at least one acquired second image and the relative exposure of the object in its environment.

16 Claims, 11 Drawing Sheets

(56) References Cited

OTHER PUBLICATIONS

L. Vacchetti, et al., "Stable real-time 3D tracking using online and offline information", IEEE Transaction on Pattern Analysis and Machine Intelligence, Oct. 2004, p. 1385-1391, vol. 26, No. 10, IEEE Computer Society.

C. Jeng, et al., "An improved real-time natural feature tracking algorithm for AR application", IEEE Computer Society, 2006, IEEE.

* cited by examiner

METHOD AND DEVICE FOR CREATING AT LEAST TWO KEY FRAMES CORRESPONDING TO A THREE-DIMENSIONAL OBJECT

The present invention concerns the combination of real and virtual images in real time, also called augmented reality, and more particularly a method and a device for creating key frames corresponding to a three-dimensional object.

The object of augmented reality is to insert one or more virtual objects into the images of a video stream. Depending on the type of application, the position and orientation of these virtual objects can be determined by data external to the scene represented by the images, for example coordinates obtained directly from a game scenario, or by data linked to certain elements of the scene, for example coordinates of a particular point in the scene such as the hand of a player. If the position and orientation are determined by data linked to certain elements of the scene, it may be necessary to track those elements as a function of movements of the camera or movements of those elements themselves within the scene. The operations of tracking elements and embedding virtual objects in real images can be executed by separate computers or by the same computer.

There exist a number of methods for tracking elements in an image stream. Element tracking algorithms, also called target pursuit algorithms, generally use a marker, which can be a visual marker, or other means such as radio-frequency or infrared marker means. Alternatively, some algorithms use shape recognition to track a particular image in an image stream.

The Ecole Polytechnique Fédérale de Lausanne has developed a visual tracking algorithm using no marker and the novelty of which lies in matching particular points in the current image of a video stream and a key frame, called a keyframe, provided by the user on initialization of the system and in a key frame updated during the visual tracking.

The objective of this visual tracking algorithm is to find, in a real scene, the pose, i.e. the position and orientation, of an object for which the three-dimensional meshing is available, or to find extrinsic position and orientation parameters relative to that object from an immobile camera filming that object, thanks to image analysis.

The current video image is compared with one or more stored key frames to find a large number of matches between those pairs of images in order to estimate the pose of the object. To this end, a key frame is composed of two elements: an image captured from the video stream and a pose (orientation and position) of a three-dimensional model appearing in that image. It is necessary to distinguish between "offline" key frames and "online" key frames. Offline key frames are images extracted from the video stream in which the object to be tracked has been placed manually using a pointing device such as a mouse or using an adjustment tool such as a Pocket Dial sold by the company Doepfer. Offline key frames characterize preferably the pose of the same object in a number of images. They are created and stored "offline", i.e. outside the ongoing regime of the application. Online key frames are stored dynamically during execution of the tracking program. They are calculated when the error, that is to say the distance between the matches of the points of interest, is low. Online key frames replace offline key frames used to initialize the application. Their use aims to reduce the offset, also known as drift, that can become large on moving too far from the initial relative position between the camera and the object. Learning new online key frames also makes the application more robust to external light variations and to camera colorimetry variations. However, they have the disadvantage of introducing a "vibration" effect into the pose of the object in time. On learning a new online key frame, the latter replaces the preceding offline or online key frame. It is used as the current key frame.

Each offline or online key frame includes an image in which the object is present and a pose for characterizing the placement of that object and a number of points of interest that characterize the object in the image. For example, the points of interest are constructed using a Harris point detector and represent locations in the image with high directional gradient values.

Before initializing the application, it is necessary to determine one or more offline key frames. These are generally images extracted from the video stream, that contain the object to be tracked and associated with a position and an orientation of the three dimensional model of that object. To this end, an operator carries out a manual operation that consists in visually matching a wire model to the real object. The manual preparation phase therefore consists in finding a first estimate of the pose of the object in an image extracted from the video stream, which amounts to formalizing the initial affine transformation $T_{p \to c}$ that corresponds to the matrix for passing between the frame of reference attached to the object and the frame of reference associated with the camera. The initial affine transformation can be divided into a first transformation $T_{o \to c}$ relating to an initial position of the object, for example at the center of the screen, i.e. a transformation linked to the change of frame of reference between the frame of reference of the camera and the frame of reference of the object, and a second transformation $T_{p \to o}$ relating to the displacement and rotation of the object from its initial position at the center of the screen to the position and orientation in which the object is really located in the key frame, where $T_{p \to c} = T_{p \to o} \cdot T_{o \to c}$. If the values a, b and g correspond to the translation of the object from its initial position at the center of the image to its position in the key frame and if the values q, f and j correspond to the rotation of the object from its initial position at the center of the image to its position in the key frame about the axes x, y and z, the transformation $T_{p \to o}$ can then be expressed in the form of the following matrix:

$$T_p^o = \begin{bmatrix} \cos\varphi\cos\phi + \sin\varphi\sin\theta\sin\phi & \sin\varphi\cos\phi - \cos\varphi\sin\theta\sin\phi & \cos\theta\sin\phi & \alpha \\ -\sin\varphi\cos\theta & \cos\varphi\cos\theta & \sin\theta & \beta \\ \sin\varphi\sin\theta\cos\phi - \cos\varphi\sin\phi & -\cos\varphi\sin\theta\cos\phi - \sin\varphi\sin\phi & \cos\theta\cos\phi & \gamma \\ 0 & 0 & 0 & 1 \end{bmatrix}$$

Using this model establishes the link between the coordinates of points of the three-dimensional model of the object in the frame of reference of the object and the coordinates of those points in the frame of reference of the camera.

On initialization of the application, the offline key frames are processed to position points of interest as a function of the parameters chosen on launching the application. Those parameters are specified empirically for each type of use of the application, modulate the match detection core and produce better quality in estimating the pose of the object according to the characteristics of the real environment. Then, if the real object in the current image is in a pose that is close to the pose of that same object in one of the offline key frames, the number of matches becomes high. It is then possible to find the affine transformation for keying the virtual three-dimensional model of the object to the real object.

When such a match has been found, the algorithm goes to the ongoing regime. Displacements of the object are tracked from one frame to the other and any drift is compensated using information contained in the offline key frame retained at initialization time and in the online key frame calculated during execution of the application.

The tracking application combines two types of algorithm: detection of points of interest, for example a modified version of Harris point detection, and a technique of reprojection of the points of interest positioned on the three-dimensional model to the image plane. This reprojection predicts the result of spatial transformation from one frame to another. These two algorithms when combined provide for robust tracking of an object according to six degrees of freedom.

Generally speaking, a point p of the image is the projection of a point P of the real scene where $p \sim P_I \cdot P_E \cdot T_{p \to c} \cdot P$ where $P_I$ is the matrix of the intrinsic parameters of the camera, i.e. its focal value, the center of the image and the offset, $P_E$ is the matrix of the extrinsic parameters of the camera, i.e. the position of the camera in the real space, and $T_{p \to c}$ is the affine matrix for passing between the frame of reference associated with the tracked object and the frame of reference of the camera. Only the position of the object relative to the position of the camera is considered here, which amounts to placing the frame of reference of the real scene at the optical center of the camera. This produces the equation $p \sim P_I \cdot T_{p \to c} \cdot P$ where $T_{p \to c}$ is the matrix of the pose of the object in the frame of reference of the camera. The matrix $P_I$ being known, the tracking problem therefore consists in determining the matrix $T_{p \to c}$.

However, it is important to note that if the error measurement gets too high, i.e. if the number of matches between the current key frame and the current image gets too small, tracking is desynchronized (the estimate of the pose of the object is considered to be no longer sufficiently coherent) and a new initialization phase using the same offline key frames is necessary.

The pose of an object is estimated according to the matches between the points of interest of the current image from the video stream, the points of interest of the current key frame and the points of interest of the preceding image from the video stream. These operations are referred to as the matching phase. From the most significant correlations, the software calculates the pose of the object corresponding best to the observations.

Figure 1:
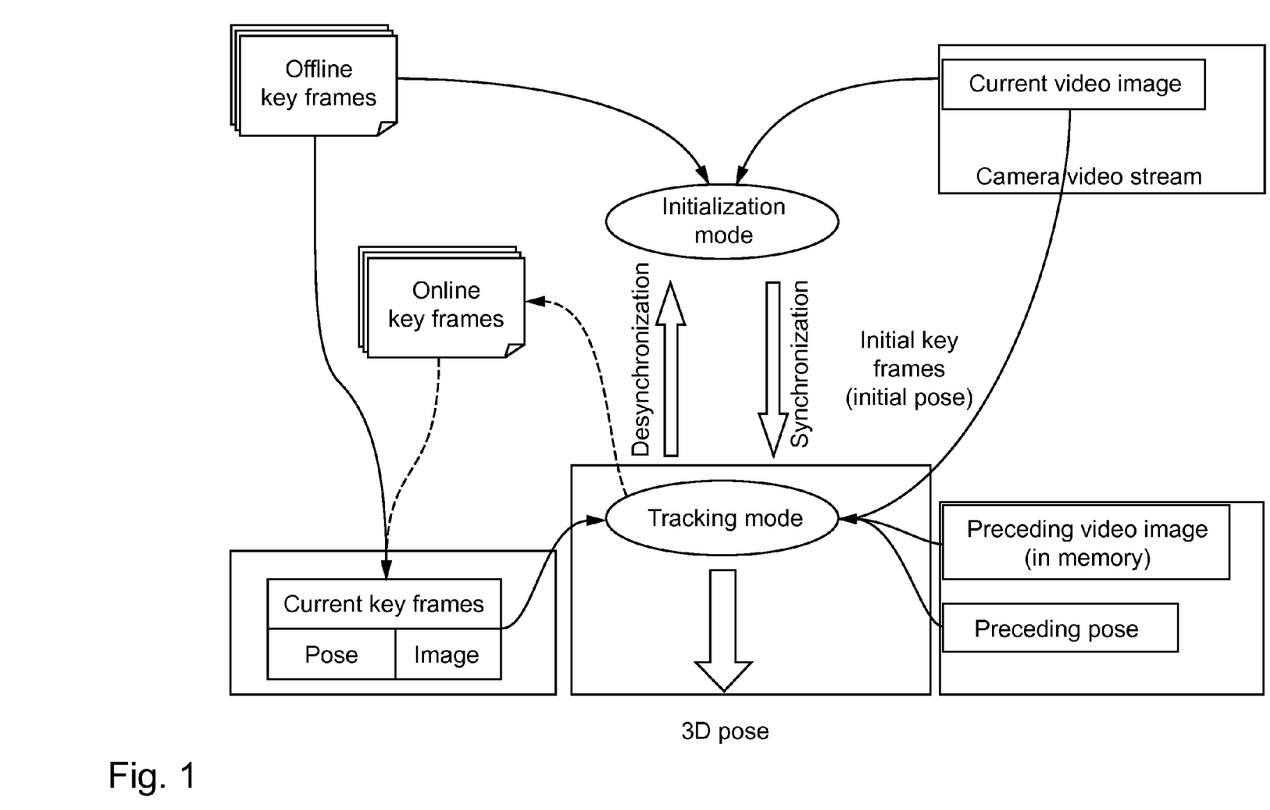
FIG. 1 represents diagrammatically the essential principles of the object tracking application developed by the Ecole Polytechnique Fédérale de Lausanne.
Figure 2:
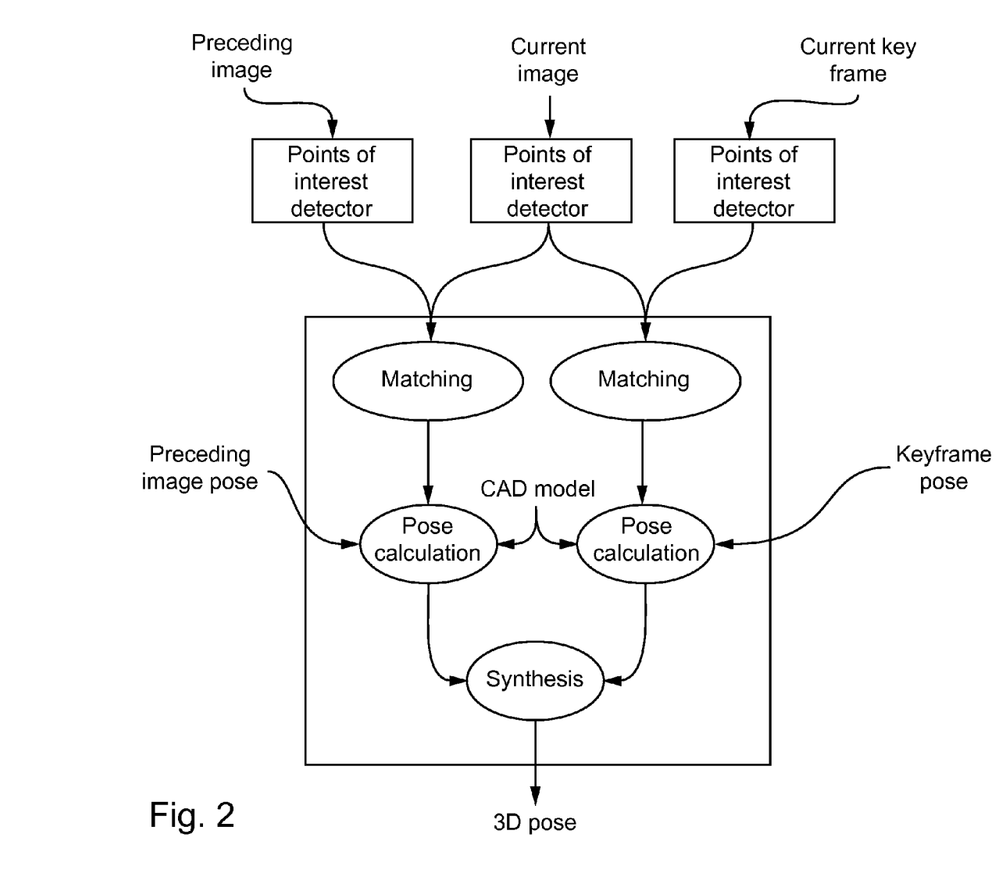
FIG. 2 illustrates certain steps of the method for determining the pose of an object in an image from a video stream from key frames and the preceding image from the video stream.

FIGS. 1 and 2 illustrate this tracking application.

The solutions proposed often stem from research and do not take into account the constraints of implementing commercial systems. In particular, problems linked to robustness, to the possibility of launching the application quickly without necessitating a manual phase of creation of offline key frames necessary for initialization of the tracking system, for detection of "desynchronization" errors (when an object to be tracked is "lost") and for automatic reinitialization in real time after such errors are often ignored.

The invention solves at least one of the problems described above.

Thus the invention consists in a method for creation of at least two key frames each comprising an image representing at least one three-dimensional object in a three-dimensional environment and the pose of the object in that environment according to the associated image viewpoint, this method being characterized in that it comprises the following steps:
  acquisition of a first image representing the object in a particular initial position;
  creation of a first key frame from the acquired first image and the relative pose of the object in its environment;
  acquisition of at least one second image representing said object, the viewpoint of said at least one second image being different from the viewpoint of said first image;
  determination of the relative pose of the object in its environment according to the difference of the viewpoints of the first image and said at least one second image, each of said viewpoints being determined relative to a position and an orientation; and
  creation of a second key frame from the acquired at least one second image and the relative pose of the object in its environment.

Thus the method of the invention automates the creation of a plurality of key frames, in particular with a view to initializing or reinitializing an augmented reality application using automatic tracking in real time of three-dimensional geometrical objects in a video stream, without using a marker. A multitude of key frames can enable the application to be initialized for any type of relative pose between the object to be tracked and the camera.

According to one particular feature, the acquisition of at least one second image representing said object is effected by means of a tracking application.

According to another particular feature, said object is at least in part a real object.

According to another particular feature, the object is at least in part a virtual object.

According to one particular feature, the virtual object is a representation of a real object according to a virtual model.

According to another particular feature, the object comprises at least one part of the environment.

In one embodiment, the viewpoints of the images belong to a set of predetermined points.

According to this feature, the construction of key frames is effected according to a particular field of view.

In one particular embodiment, the steps of the creation method are repeated for at least one part of the object.

The invention is also aimed at a device for automatic creation of at least two key frames each comprising an image representing at least one three-dimensional object in a three-dimensional environment and the pose of the object in that environment according to the associated image viewpoint, this device being characterized in that it comprises:
  means for acquisition of a first image representing the object in a particular initial position;
  means for creation of a first key frame from the acquired first image and the relative pose of the object in its environment;
  means for acquisition of at least one second image representing said object, the viewpoint of said at least one second image being different from the viewpoint of said first image;
  means for determination of the relative pose of the object in its environment according to the difference of the viewpoints of the first image and said at least one second image, each of said viewpoints being determined relative to a position and an orientation; and
  means for creation of a second key frame from the acquired at least one second image and the relative pose of the object in its environment.

This device has the same advantages as the method briefly described above, which are not repeated here.

The present invention is also directed to a storage medium, possibly partly or totally removable, readable by a computer or a microprocessor, containing code instructions of a computer program for executing each of the steps of the method described above.

The present invention is finally directed to a computer program including instructions adapted to execute each of the steps of the method described above.

Other advantages, objects and features of the present invention emerge from the following detailed description given by way of nonlimiting example with reference to the appended drawings, in which.

Figure 3:
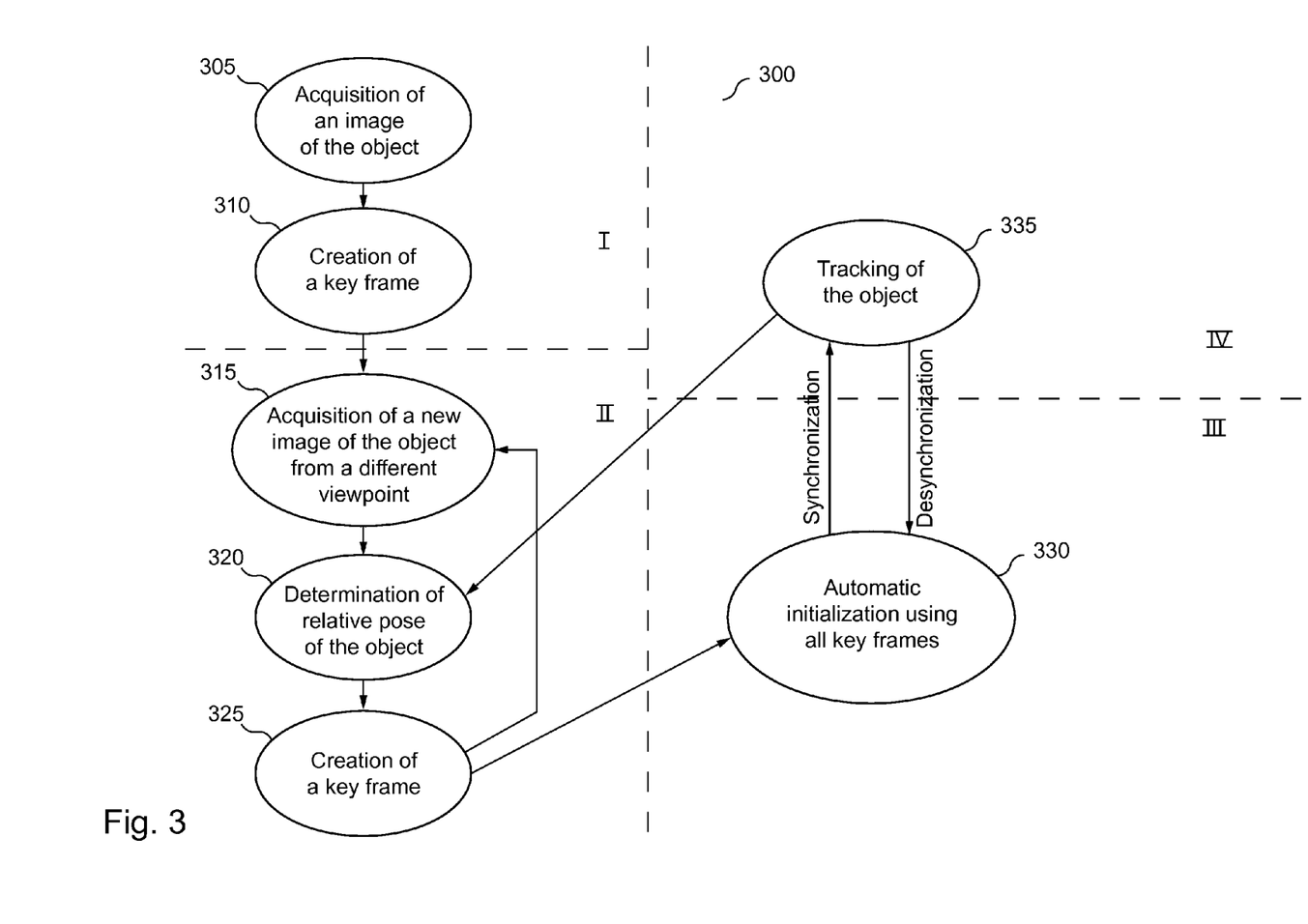
FIG. 3 represents a general diagram of the creation of key frames of a three-dimensional object of any geometry in an environment using the invention.

A particular object of the method of the invention is the creation, in particular automatic creation, of key frames of a three-dimensional object in an environment with a view to automating the initialization and reinitialization phases after desynchronization of the object tracking application on images from a video stream. A multitude of key frames can enable the application to be initialized for any type of relative poses between the object to be tracked and the camera. FIG. 3 is a general diagram showing the creation of key frames, in particular "offline" key frames, of an object in an environment using the invention, for use by an object tracking application.

As shown in FIG. 3, the creation of key frames of an object in an environment and the execution of a tracking application 300 using those key frames comprises four phases: a phase (I) of creating a first key frame, a phase (II) of automated creation of subsequent key frames, a tracking initialization phase (III) that uses the key frame or images previously created, and an object tracking phase (IV) that corresponds to the ongoing regime of the application.

The phase (I) of creating a first key frame consists principally in the acquisition of a first image representing the three-dimensional object in an initial position. This acquisition is effected, in particular, using imaging means such as a video camera or a still camera. Having acquired the image of the three-dimensional object (step 305), a first key frame is created (step 310) comprising, on the one hand, the acquired first image and, on the other hand, the relative pose of the object in the environment according to the viewpoint of the image.

In the prior art, to construct a key frame, it is necessary to place the three-dimensional meshing corresponding to the object on the object in the image by hand. However, this step is irksome. However, knowing the type of application can reduce simplify the creation of a key frame (step 310). For example, it will be relevant to use an orientation sensor for applications in which the movement of the camera is constrained in rotation or to use a textured virtual model of the object in a known position.

To make the tracking algorithm more robust, it is sometimes important to capture a series of key frames corresponding to a number of relative poses between the camera and the object. During the phase (II) of creating the subsequent key frames, a first step consists in acquiring a new image representing the object (step 315), the viewpoint of the second image being different from the viewpoint of the first image. The relative pose of the object is then determined in its environment according to the different viewpoints of the images (step 320), each of said viewpoints being determined relative to a position and an orientation. This step can be effected in a number of ways. First of all, if the textured three-dimensional virtual model of the object to be tracked is available, it is possible to create these new key frames by varying the pose parameters of the object in front of the camera. It is also particularly beneficial to use the tracking application (335) to generate new key frames. Thus the new key frames created online can be reused to improve the quality of the initialization of the tracking algorithm. Finally, a new key frame is created (325) from each new image and the relative pose of the object in its environment.

The steps of this phase are repeated to create a plurality of key frames.

During the initialization phase (III), from all the key frames creating during phase (I) and phase (II), the tracking application is initialized by searching for a key frame representing the object in the video stream containing the object to be tracked (step 330) and closest to the current configuration (relative position between the camera and the object).

When the pose of the object is determined in the first image and the current key frame is selected (key frame determined during the initialization phase) (step 330), the tracking application can find the object (phase IV) in the successive images of the video stream using a tracking mechanism (step 335). In this mechanism, movements of the object (movement of the object in the scene or movement induced by the movement of the camera in the scene) are tracked from one frame to another and any drift is compensated using information contained in the offline key frame retained at initialization time and, where applicable, in the online key frame calculated during execution of the application (which key frame can itself be used afterwards as an offline key frame to initialize the application automatically), except that the new key frames created online can be used for this reinitialization step.

If the measured error becomes too high, tracking is desynchronized and a reinitialization phase is necessary. The reinitialization phase is similar to the initialization phase described above (step 330).

Figure 4:
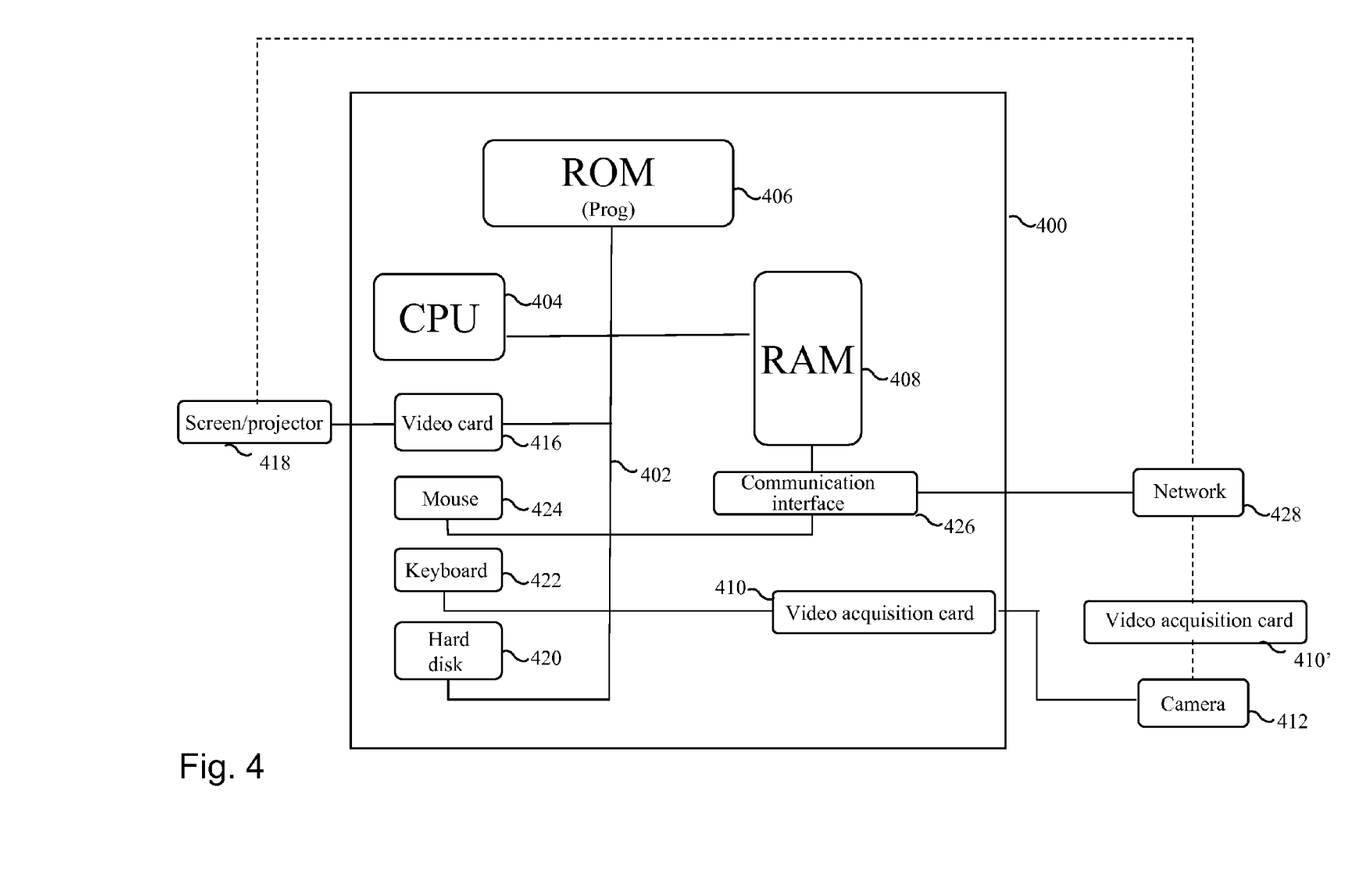
FIG. 4 shows one example of a device for implementing at least part of the invention.

FIG. 4 represents diagrammatically a device adapted to implement the invention. The device 400 is a microcomputer, a workstation or a gaming console, for example.

The device 400 preferably includes a communication bus 402 to which are connected:

a central processor unit (CPU) or microprocessor 404;

a read-only memory (ROM) 406 that can contain the operating system and programs ("Prog");

a random-access memory (RAM) or cache memory 408 including registers adapted to store variables and parameters created and modified during execution of the above programs;

a video acquisition card 410 connected to a camera 412; and a graphics card 416 connected to a screen or projector 418.

The device 400 can optionally also include the following:

a hard disk 420 that can contain the aforementioned programs ("Prog") and data processed or to be processed in accordance with the invention;

a keyboard 422 and a mouse 424 or any other pointing device such as a light pen, a touch-sensitive screen or a remote control enabling the user to interact with the programs of the invention;

a communication interface 426 connected to a distributed communication network 428, for example the Internet, this interface being adapted to transmit and receive data;

a data acquisition card 414 connected to a sensor (not shown); and a memory card reader (not shown) adapted to read or write therein data processed or to be processed in accordance with the invention.

The communication bus provides for communication and interworking between the various elements included in the device 400 or connected to it. The representation of the bus is not limiting on the invention and, in particular, the central processor unit can communicate instructions to any element of the device 400 directly or via another element of the device 400.

The executable code of each program enabling the programming device to implement the method of the invention can be stored on the hard disk 420 or in the read-only memory 406, for example.

Alternatively, the executable code of the programs could be received via the communication network 428, via the interface 426, to be stored in exactly the same way as described above.

The memory cards can be replaced by any information medium such as, for example, a compact disk (CD-ROM or DVD). As a general rule, the memory cards can be replaced by information storage means readable by a computer or by a microprocessor, integrated into the device or not, possibly removable, and adapted to store one or more programs the execution of which executes the method of the invention.

More generally, the program or programs can be loaded into one of the storage means of the device 400 before being executed.

The central processor unit 404 controls and directs the execution of the instructions or software code portions of the program or programs of the invention, which instructions are stored on the hard disk 420 or in the read-only memory 406 or in the other storage elements cited above. On power up, the program or programs that are stored in a non-volatile memory, for example the hard disk 420 or the read-only memory 406, are transferred into the random-access memory 408, which then contains the executable code of the program or programs of the invention, together with registers for storing the variables and parameters necessary to implementation of the invention.

It should be noted that the communication device including the device of the invention can equally be a programmed device. That device then contains the code of the computer program or programs, for example fixedly programmed into an application-specific integrated circuit (ASIC).

Alternatively, the image from the video card 416 can be transmitted to the screen or projector 418 via the communication interface 426 and the distributed communication network 428. Likewise, the camera 412 can be connected to a video acquisition card 410' separate from the device 400 and images from the camera 412 transmitted to the device 400 via the distributed communication network 428 and the communication interface 426.

Because of the simplification of implementation provided by the method of the invention, the key frames can be created without recourse to a specialist. After the creation of a set of key frames, a tracking application can be initialized on the basis of that set and used in the standard way to track an object in a sequence of images from a video stream, for example to embed a video sequence in an object from the scene taking into account the position and the orientation of that object, but also to determine the movement of a camera according to the analysis of an object from the scene. In this case, the object is part of the scene and finding the pose of that object in the scene therefore amounts to finding the pose of the camera relative to it. It then becomes possible to add virtual elements to the scene provided that the geometrical transformation between the object and the geometrical model of the scene is known. This is the case. This approach therefore augments the real scene with animated virtual objects that move as a function of the geometry of the scene.

In particular, in a first embodiment, the application can consist in estimating the pose of a three-dimensional object, for example an engine in a vehicle, and adding information to that object in order to provide the user with information concerning that object, for example installing and removing the engine.

Figure 5:
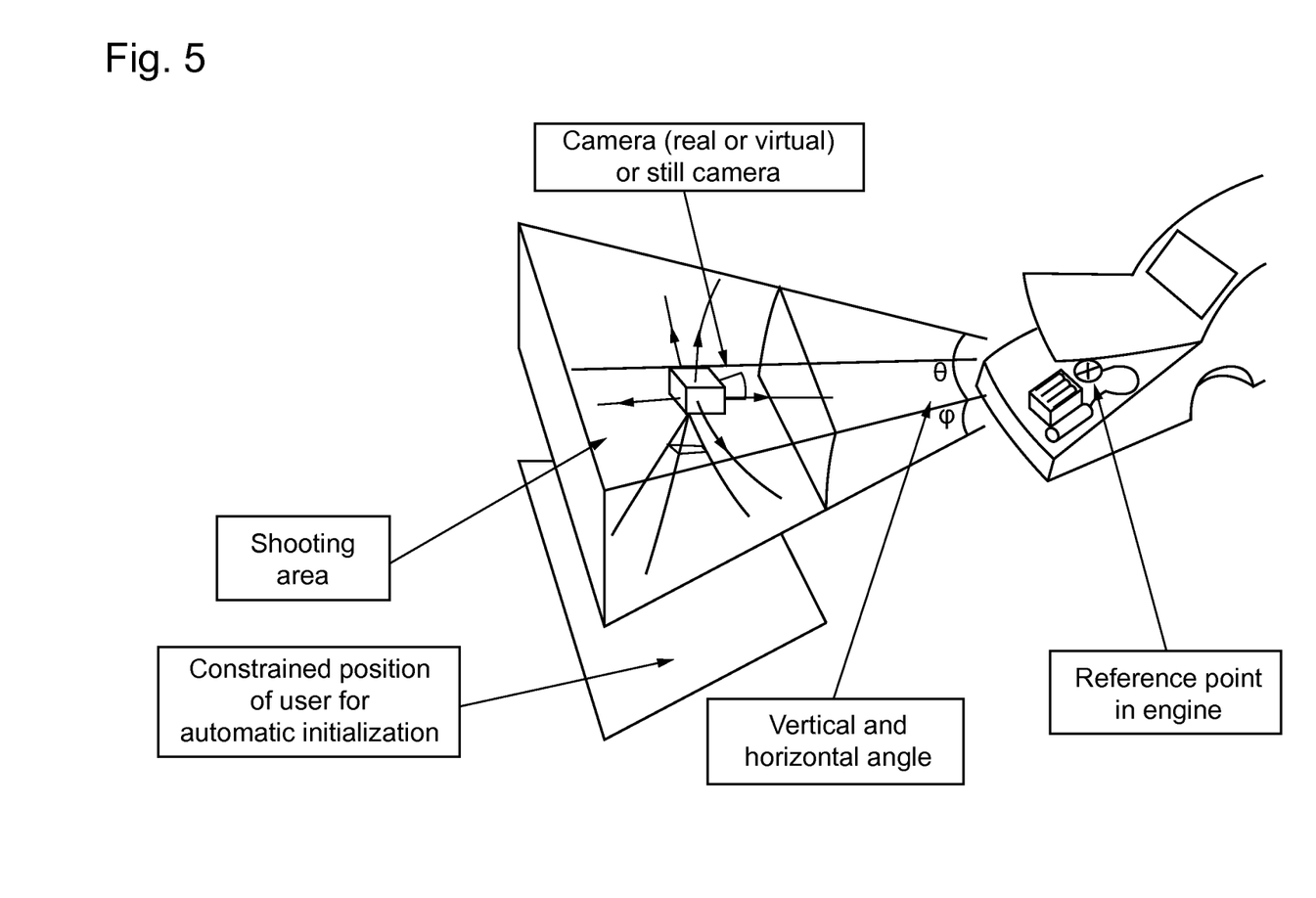
FIG. 5 illustrates one example of learning key frames of a vehicle engine.

To this end, the application necessitates learning a number of key frames that thereafter allow automatic initialization of the tracking application in the image. Incidentally, given that the position of the user is known approximately, the position of the camera relative to the three-dimensional object to be tracked is known. Thus the creation of the key frames (phases I and II) and initialization (phase III) are simplified by the fact that the position of the user relative to the three-dimensional object is known and that a small number of key frames is required to render initialization totally automatic. The position, corresponding in particular to the height of a person, i.e. approximately 1.70 meters and an orientation more or less facing the three-dimensional object, enables the use of a few pertinent key frames in this viewing area. FIG. 5 illustrates diagrammatically the shooting area for producing the key frames.

In a first embodiment, to enable automatic initialization of the three-dimensional object tracking system, a learning phase is necessary that consists in acquiring a number of key frames containing the three-dimensional object in the user's shooting area.

The shooting area can be adapted as a function of the use.

In a second embodiment, the phase of learning the key frames is carried out using textured synthetic three-dimensional models of the object, for example the engine and the car. In this embodiment, automatic learning is effected by varying the angles $\theta$ and $\phi$ corresponding to the vertical and horizontal angles of the camera (real or virtual) and the distance of the camera relative to the three-dimensional model of the object.

If a textured three-dimensional model is available of the geometry of the object, for example of the car and its engine, that model can be moved in the field of view of the camera. There is then obtained a three-dimensional series of renditions of the object by images corresponding to the object viewed from different angles. These images are also associated with the known pose of the object, determined from the parameters $\theta$, $\phi$ and from the distance of the camera relative to the object. Thus a set of key frames is created entirely automatically (phases I and II).

In this embodiment, the learning phase is therefore of relatively low cost and in particular enables preparations to be made for the maintenance of a product even before its fabrication. The CAD (computer-assisted design) of the product is usually modeled even before it is actually constructed.

Moreover, the textured CAD model of an object used under different lighting conditions can approximate the conditions of the real environment.

The next phase (phase III) is that of automatic initialization from the key frames.

That initialization consists in a first estimation of the pose of the three-dimensional object. In the example considered here, the pose of the engine is estimated at the moment the user opens the bonnet of the car. At this moment, many points of interest of the current image are correlated with one of the key frames.

Figure 6:
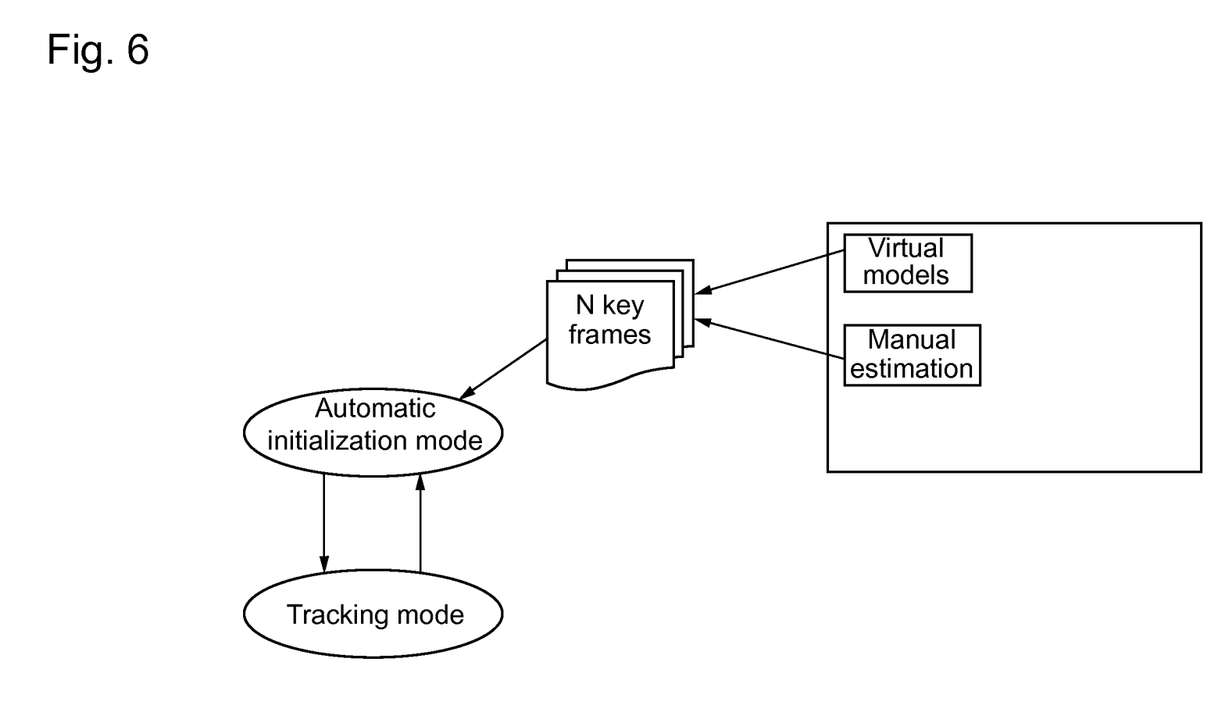
FIG. 6 shows an algorithm for automatic initialization of a tracking application of the invention using key frames created from real or virtual three-dimensional objects.

FIG. 6 shows the automatic initialization of the key frames from real or virtual three-dimensional objects.

In a second embodiment, the application can consist in finding the pose of an object in a plurality of target objects, which can be activated to track them. A target object can be activated manually, in particular by means of an OCX (OLE (Object Linking and Embedding) Control Extension) interface.

Consider a machine tool, for example.

In the current application, for example, a distant camera position gives the pose of the machine as a whole, whereas in close up only a precise portion of the machine tool, for example an electrical enclosure, will be tracked, first from the exterior viewpoint and then from the interior viewpoint.

In this embodiment, the use of state-transition automata can change the key frames as a function of the current state and track the pose of different objects.

Figure 7:
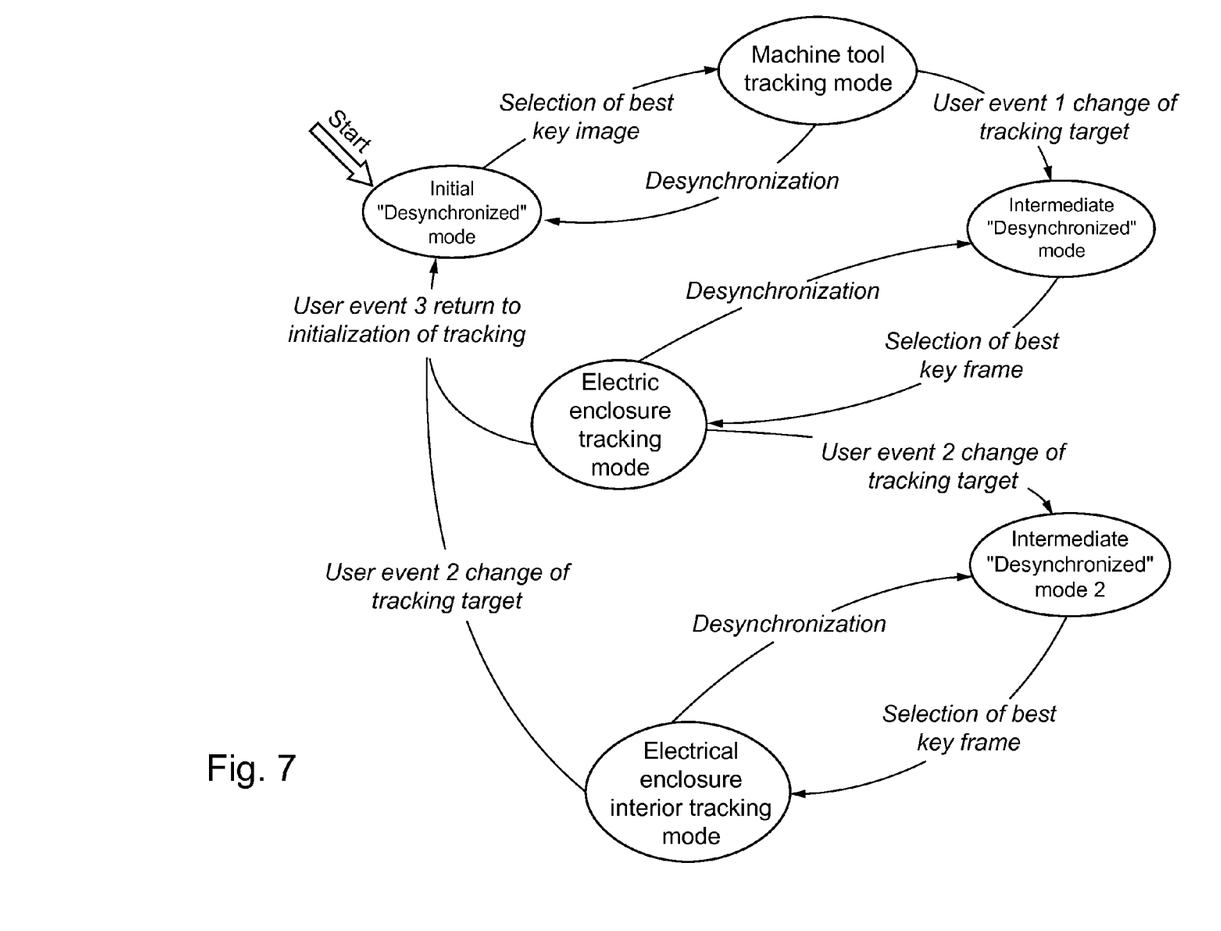
FIG. 7 shows a graph of transition states for tracking an object from a plurality of target objects.

FIG. 7 shows a transition-state automaton for the example considered here.

The transitions from one state to another are triggered when the user approaches a new object to be tracked and commands a change of the target object to be tracked, for example by pushing a button.

The tracking application then goes to an intermediate desynchronized mode, equivalent to an initialization mode, which necessitates the use of a new series of key frames corresponding to the selected target object and associated with the new state of the automaton.

In a third embodiment, the application can consist in finding the position of the line of sight of a user. In an application such as a shooting simulator, in this embodiment, the application can consist in finding the position of the line of sight of the gun, in particular by matching points of interest between the current image and the landscape of the shooting simulator.

In this embodiment, the camera has a static position because it is fixed to a fixed tripod and the exterior conditions are constant. The landscape of the shooting simulator comprises no change of weather nor the sudden appearance of large objects moving in and masking the landscape.

Figure 8:
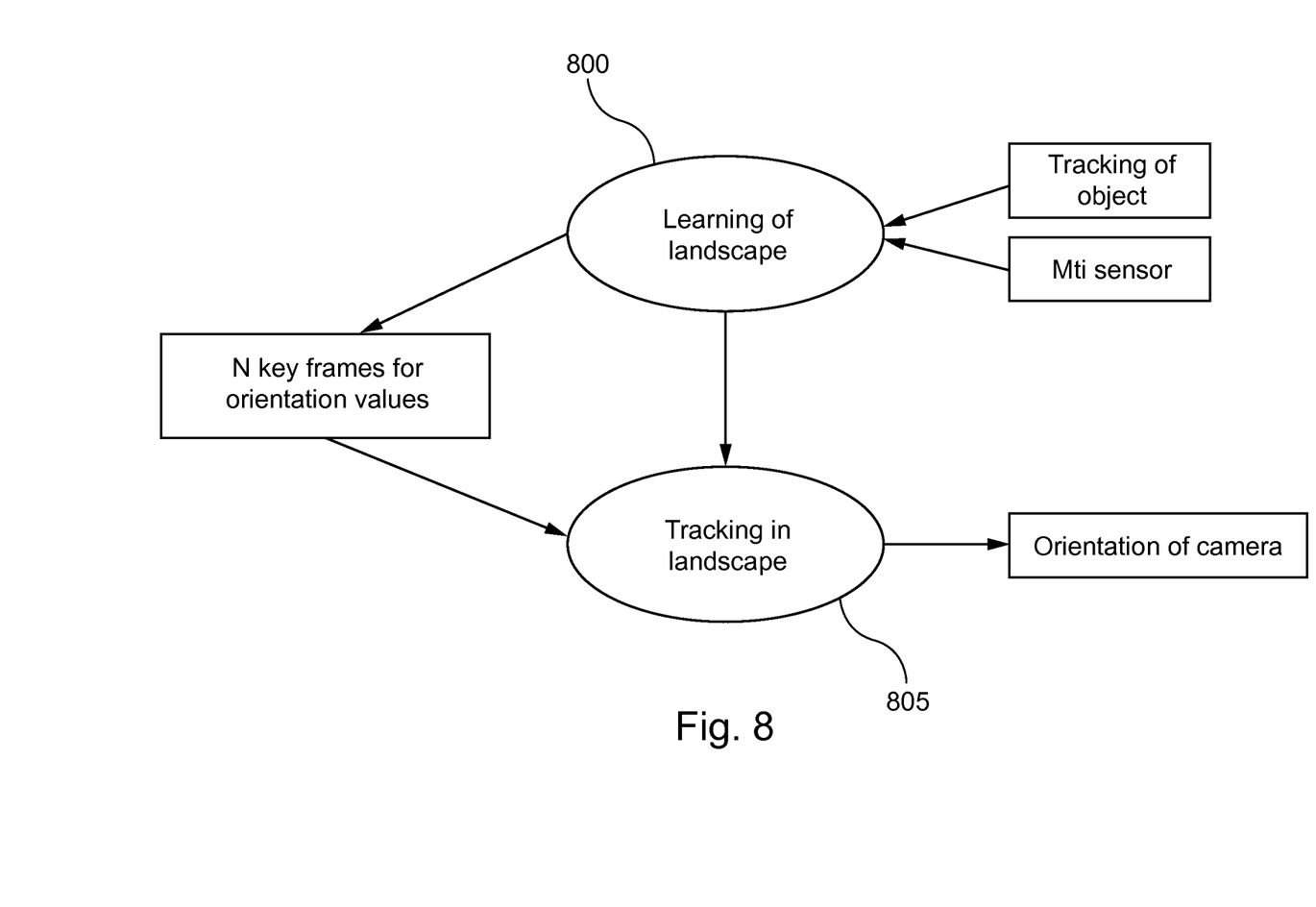
FIG. 8 illustrates an algorithm for tracking in a landscape.

In this embodiment, the application includes two steps shown in FIG. 8, namely a step of learning the landscape (step 800) and consisting in the creation of a plurality of key frames of the landscape (phase I and II), associated with yaw, pitch and roll parameter values determined by means of a sensor, for example, and a step of tracking in the landscape (step 805) in which the key frames previously stored are used for matching and estimating the current pose of the camera. This approach is made possible by knowing the type of application. In this embodiment, movements of the camera are restricted to rotations, which enables the use of a sensor.

In this embodiment, the tracking application is coupled to a movement sensor, for example an Mti Sensor from the company MTI Instruments or an inertiaCube3 sensor from the company Intersense. Despite the fact that this sensor is not sufficiently accurate to find a precise orientation in the image, it can substantially correct tracking in the event of an error.

The learning phase consists in moving the camera around its vertical axis, defined in particular by the tripod, and acquiring a number of key frames as a function of the orientation of the camera according to the yaw, pitch and roll parameters.

This phase has the particular feature of using the object tracking algorithm to create new key frames (step 325).

Figure 9:
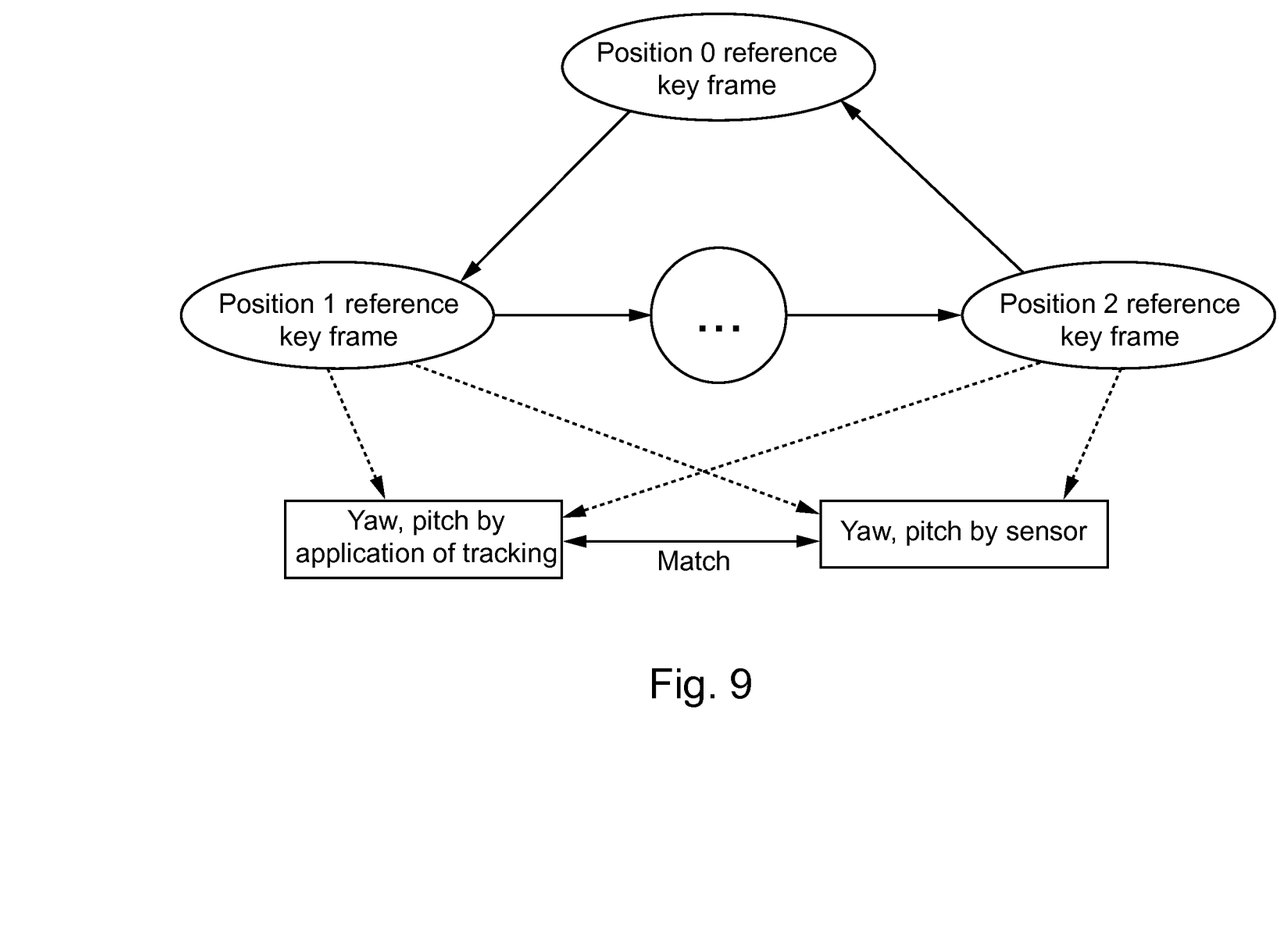
FIG. 9 shows an algorithm of the invention for creating key frames of a landscape using the invention.

FIG. 9 illustrates this algorithm.

The algorithm starts at a position "0" by acquiring a first key frame and searching for points of interest in that first image. The camera is then rotated according to the yaw or pitch parameter. The tracking application then finds the matches between the points of interest of the first key frame acquired at the position "0" and the current image from the video stream.

If the number of matches becomes too small, a new image is acquired at the current position according to the yaw and pitch parameters. This new image becomes the key frame.

To limit drift in this type of learning, the camera can return regularly to its original position.

Figure 10:
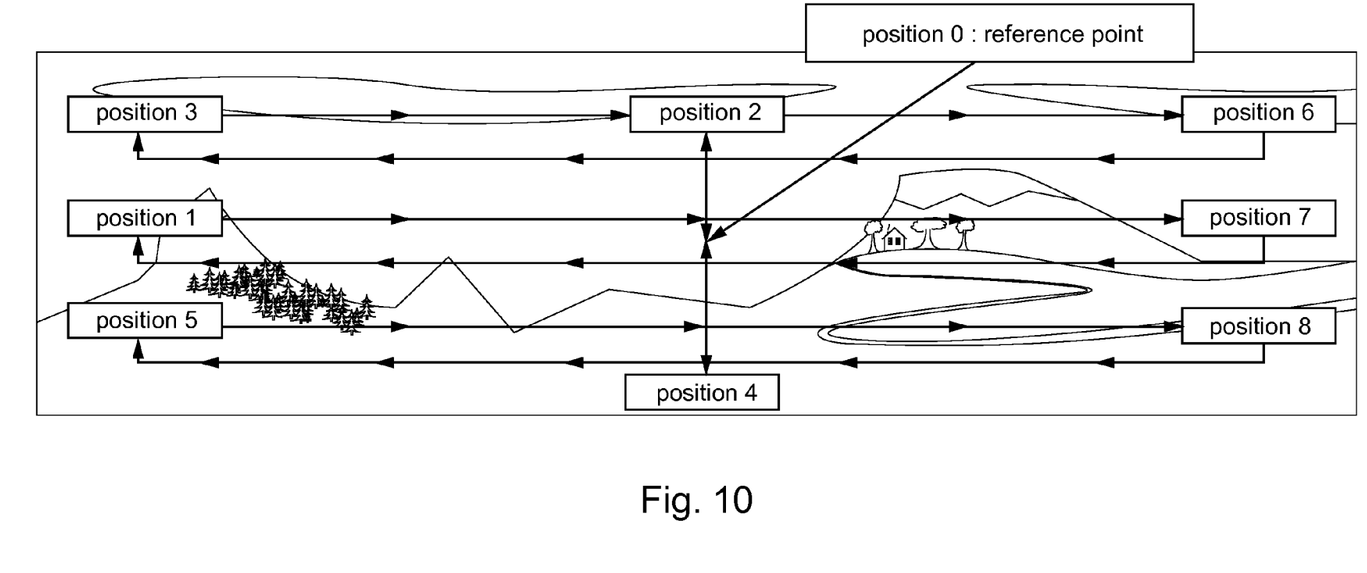
FIG. 10 shows a path for learning a landscape.

FIG. 10 shows an example of a path for learning a landscape, in particular avoiding drift.

Figure 11:
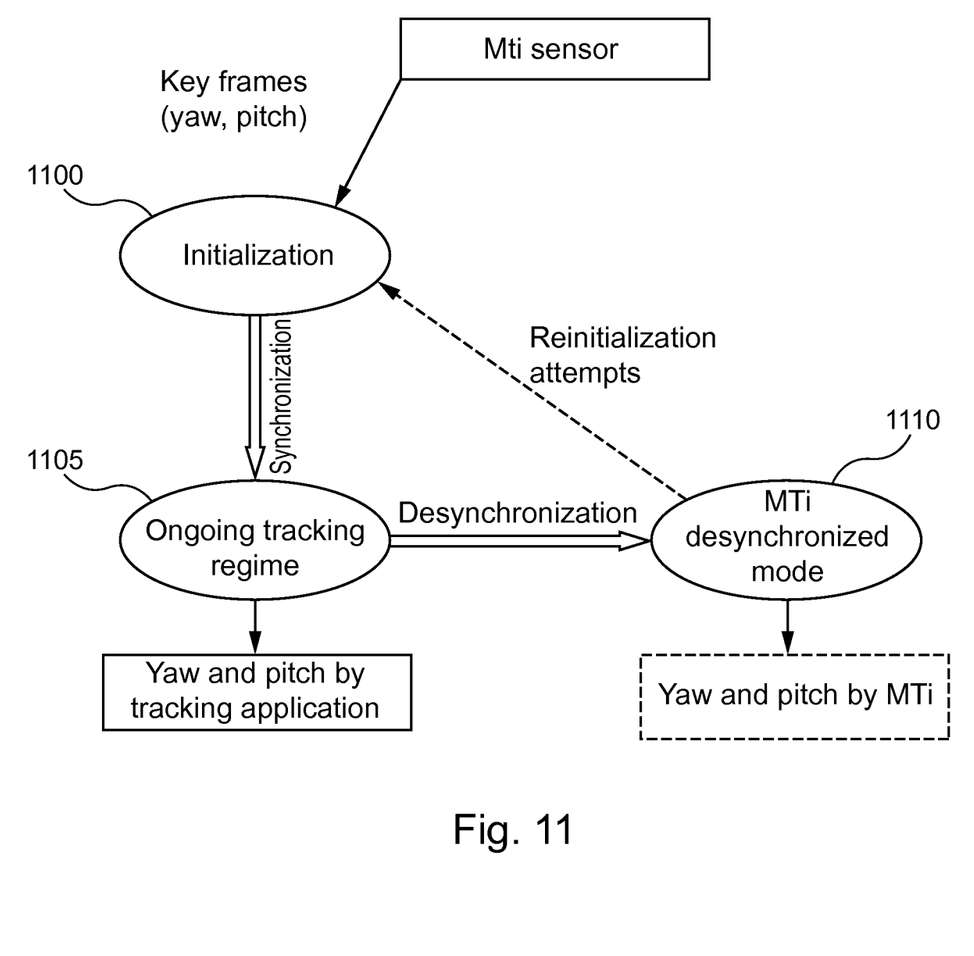
FIG. 11 shows an algorithm of the invention for tracking in a landscape.

A tracking algorithm of this embodiment is described next, with reference to FIG. 11.

During execution of the tracking application, information previously learned is used to find the offline key frame for automatic initialization of the tracking phase. This initialization (step 1100) can be carried out by means of a sensor, for example, such as an Mti sensor that provides camera orientation parameter information.

After this initialization step, the tracking application is executed (step 1105).

However, the tracking of an object can become desynchronized (step 1110), for example if the weather changes or the user turns the camera rapidly or the user moves out of the landscape area that has been learned. In this case, the tracking application goes to back-up mode to prolong the illusion of tracking during which, for example, the MTi sensor will decide the current orientation of the camera.

The tracking algorithm then attempts to resynchronize, for example by effecting an automatic initialization using orientation parameters sent by the sensor.

In the desynchronized mode, tracking is therefore maintained by using the sensor, for example the Mti sensor. The accuracy of such a sensor being of minor importance, reinitialization is attempted.

During the execution of the tracking application, camera movements find a new key frame for tracking. The movements are reproduced in accordance with the yaw and pitch parameters of the orientations of the camera. If the number of points of interest between the current image and the key frame is no longer sufficient, a new key frame must be used according to the new orientation parameters of that space.

Naturally, to satisfy particular requirements, a person skilled in the field of the invention can make modifications to the above description.

The invention claimed is:

1. A method of automatic creation of at least two initialization key frames each comprising an image representing at least one three-dimensional object in a three-dimensional environment and the pose of the object in that environment according to the associated image viewpoint; acquiring a first image representing the object in a particular initial position; creating a first key frame comprising from the first image acquired and the relative pose of the object in its environment; acquiring at least one second image representing said object, the viewpoint of said at least one second image being different from the viewpoint of said first image; determining the relative pose of the object in its environment according to the difference of the viewpoints of the first image and said at least one second image, each of said viewpoints being determined relative to position and orientation parameters, at least one of said parameters being determined independently of said images; and creating at least one second key frame comprising the acquired at least one second image and the relative pose of the object in its environment determined as a function of the difference of the viewpoints of the first image and said at least one second image wherein each viewpoint associated with the first image is different from each viewpoint associated with the second image.

2. The creation method according to claim 1 wherein said at least one of said parameters is determined according to a predetermined position.

3. Creation method according to claim 1 wherein the calculation of said at least one of said parameters is based on a value coming from an angular sensor.

4. Creation method according to claim 1, wherein the acquisition of at least one second image representing said object is effected by means of a tracking application.

5. The creation method according to claim 1, wherein said object is at least part of a real object.

6. The creation method according to claim 1, wherein the object is at least part of a virtual object.

7. The creation method according to claim 6, wherein the virtual object is a representation of a real object according to a virtual model.

8. The creation method according to claim 6 wherein the object comprises at least part of the environment.

9. The creation method according claim 1, wherein the viewpoints of the images belong to a set of predetermined points.

10. The creation method according to claim 1, wherein the steps of the creation method are repeated for at least one part of the object.

11. A computer program stored on a non-transitory computer readable storage medium for creating at least two initialization key frames each comprising an image representing at least one three-dimensional object in a three-dimensional environment and the pose of the object in that environment according to the associated image viewpoint; acquiring a first image representing the object in a particular initial position; creating a first key frame comprising from the first image acquired and the relative pose of the object in its environment; acquiring at least one second image representing said object, the viewpoint of said at least one second image being different from the viewpoint of said first image; determining the relative pose of the object in its environment according to the difference of the viewpoints of the first image and said at least one second image, each of said viewpoints being determined relative to position and orientation parameters, at least one of said parameters being determined independently of said images; and creating at least one second key frame comprising the acquired at least one second image and the relative pose of the object in its environment determined as a function of the difference of the viewpoints of the first image and said at least one second image wherein each viewpoint associated with the first image is different from each viewpoint associated with the second image.

12. A device for automatic creation of at least two initialization key frames each comprising an image representing at least one three-dimensional object in a three-dimensional environment and the pose of the object in that environment according to the associated image viewpoint; acquiring a first image representing the object in a particular initial position; creating a first key frame comprising from the first image acquired and the relative pose of the object in its environment; acquiring at least one second image representing said object, the viewpoint of said at least one second image being different from the viewpoint of said first image; determining the relative pose of the object in its environment according to the difference of the viewpoints of the first image and said at least one second image, each of said viewpoints being determined relative to position and orientation parameters, at least one of said parameters being determined independently of said images; and creating at least one second key frame comprising the acquired at least one second image and the relative pose of the object in its environment determined as a function of the difference of the viewpoints of the first image and said at least one second image wherein each viewpoint associated with the first image is different from each viewpoint associated with the second image.

13. The creation device according to claim 12 wherein the processor is further configured to acquire at least one value from a angular sensor, said value being used to calculate said at least one of said parameters.

14. The creation device according to claim 12 wherein the step of acquiring at least one second image representing said object comprises acquiring at least one second image by means of a tracking application.

15. The creation device according to claim 12 wherein the object is at least in part a real object or at least in part a virtual object.

16. The creation device, according to claim 12 wherein, the image viewpoints belong to a set of predetermined points.

* * * * *